United States Patent
Mosher et al.

(10) Patent No.: US 11,801,638 B2
(45) Date of Patent: Oct. 31, 2023

(54) PRINTERS

(71) Applicant: Hewlett-Packard Development Company, L.P., Spring, TX (US)

(72) Inventors: Daniel Mosher, Corvallis, OR (US); Brian Bay, Corvallis, OR (US); David A. Champion, Lebanon, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 80 days.

(21) Appl. No.: 16/608,416

(22) PCT Filed: Aug. 31, 2017

(86) PCT No.: PCT/US2017/049750
§ 371 (c)(1),
(2) Date: Oct. 25, 2019

(87) PCT Pub. No.: WO2019/045744
PCT Pub. Date: Mar. 7, 2019

(65) Prior Publication Data
US 2020/0189200 A1  Jun. 18, 2020

(51) Int. Cl.
| | | |
|---|---|---|
| *B29C 67/00* | (2017.01) | |
| *B29C 64/343* | (2017.01) | |
| *B33Y 50/02* | (2015.01) | |
| *B29C 64/393* | (2017.01) | |
| *B22F 10/31* | (2021.01) | |
| *B22F 10/28* | (2021.01) | |
| *B22F 12/90* | (2021.01) | |

(52) U.S. Cl.
CPC ............. *B29C 64/343* (2017.08); *B22F 10/31* (2021.01); *B29C 64/393* (2017.08); *B33Y 50/02* (2014.12); *B22F 10/28* (2021.01); *B22F 12/90* (2021.01)

(58) Field of Classification Search
CPC ....... B22F 10/30; B29C 64/343; B33Y 10/00; B33Y 30/00; B33Y 50/00; B33Y 50/02
See application file for complete search history.

(56) References Cited

U.S. PATENT DOCUMENTS

| | | | |
|---|---|---|---|
| 5,460,758 A | 10/1995 | Langer et al. | |
| 6,780,368 B2 | 8/2004 | Liu et al. | |
| 2009/0152771 A1* | 6/2009 | Philippi ................. | B33Y 10/00 264/410 |

(Continued)

FOREIGN PATENT DOCUMENTS

| | | |
|---|---|---|
| CN | 101678613 | 3/2010 |
| CN | 105307840 | 2/2016 |

(Continued)

OTHER PUBLICATIONS

International Searching Authority, "Search Report and Written Opinion," issued in connection with International Patent Application No. PCT/US2017/049750, dated Jun. 28, 2018, 6 pages.

(Continued)

*Primary Examiner* — Ryan M Ochylski
(74) *Attorney, Agent, or Firm* — SHOOK, HARDY & BACON L.L.P.

(57) ABSTRACT

Printers are disclosed. An example printer includes a build controller to access metrics of a layer on a work area and to select a dosing profile from a plurality of dosing profiles to fuse the layer based on the metrics.

19 Claims, 5 Drawing Sheets

(56) References Cited

U.S. PATENT DOCUMENTS

| | | | |
|---|---|---|---|
| 2015/0024233 A1 | 1/2015 | Gunther | |
| 2015/0045928 A1 | 2/2015 | Perez et al. | |
| 2015/0165683 A1 | 6/2015 | Cheverton et al. | |
| 2015/0177158 A1 | 6/2015 | Cheverton | |
| 2016/0144573 A1* | 5/2016 | Hirata | B29C 64/393 |
| | | | 425/141 |
| 2017/0066192 A1* | 3/2017 | Cho | B29C 64/268 |
| 2018/0154588 A1* | 6/2018 | Wilenski | B29C 64/135 |
| 2019/0118300 A1* | 4/2019 | Penny | B23K 26/0821 |

FOREIGN PATENT DOCUMENTS

| | | |
|---|---|---|
| EP | 3002109 | 4/2016 |
| JP | 2016097632 | 5/2016 |
| JP | 2016-535690 | 11/2016 |
| JP | 2017512675 | 5/2017 |
| WO | 2015106844 | 7/2015 |
| WO | 2015170330 | 11/2015 |
| WO | 2015174919 | 11/2015 |
| WO | 2016084367 | 6/2016 |
| WO | 2016175813 | 11/2016 |

OTHER PUBLICATIONS

International Bureau, "International Preliminary Report on Patentability," issued in connection with International Patent Application No. PCT/US2017/049750, dated Mar. 3, 2020, 5 pages.

Sitthi-Amorn et al., "MultiFab: A Machine Vision Assisted Platform for Multi-material 3D Printing," ACM Transactions of Graphics (SIGGRAPH 2015), 2015, http://cfg.mit.edu/content/multifab-machine-vision-assisted-platform-multi-material-3d-printing, 2 pages.

Baumann et al., "Vision based error detection for 3D printing processes," MATEC Web of Conferences, 59, 06003, 2016, https://www.matec-conferences.org/articles/matecconf/pdf/2016/22/matecconf_icfst2016_06003.pd, 7 pages.

* cited by examiner

PRINTERS

BACKGROUND

Additive manufacturing systems may be used to produce three-dimensional objects. In some examples, the three-dimensional objects are produced in layers using build material.

Figure 1:
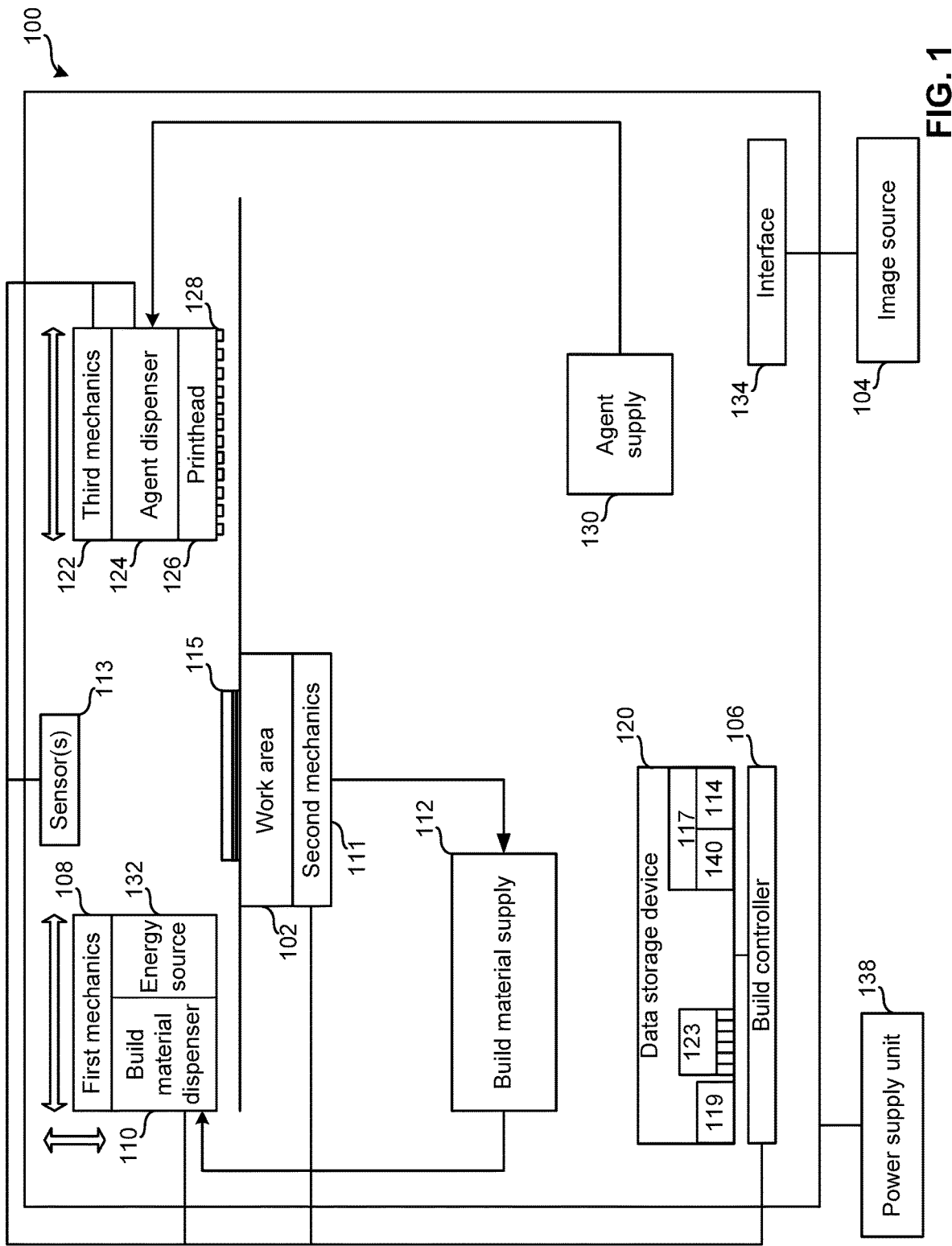
FIG. 1 is a schematic illustration of an example printer in accordance with the teachings of this disclosure.

The figures are not to scale. Wherever possible, the same reference numbers will be used throughout the drawing(s) and accompanying written description to refer to the same or like parts. While the drawings illustrate examples of printers and associated build controllers, other examples may be employed to implement the examples disclosed herein.

DETAILED DESCRIPTION

The examples disclosed herein relate to determining build-metrics in-situ during additive manufacturing processes, identifying differences between the determined build-metrics and reference build-metrics and changing build characteristics of the additive manufacturing process in real time to address the differences identified. Thus, objects produced according to the teachings of this disclosure can be determined to satisfy a quality threshold during the manufacturing process without subsequent and/or costly quality analysis taking place. Moreover, the examples disclosed herein enable build processes to be dynamically updated based on feedback received in substantially real time to enable objects produced to satisfy a desired result. As set forth herein, "substantially real time" accounts for transmission and/or processing delays. By dynamically updating the additive manufacturing process based on previous layers, previous builds and/or other data, the examples disclosed herein reduce the number of objects, layers, etc. produced that do not satisfy a quality threshold.

In some examples, changing the build characteristics of the additive manufacturing process includes redistributing build material on a work area to reduce topographical variances, changing the z-position of the work area to change the gradient and/or thickness of the build material on the work area and/or changing the z-position of the build material dispenser to change the gradient and/or thickness of the build material on the work area. The build material dispenser may include a blade, a wiper, a roller, a brush, etc.

Additionally or alternatively, in some examples, changing the build characteristics of the additive manufacturing process includes determining and/or selecting a dosing profile to fuse layers of build material. In other words, some layers may be fused using a first dosing profile and some layers may be fused using a second dosing profile. The dosing profile may include the dosage of agent (e.g., such as a fusing or energy absorbing agent) provided to a layer of build material on a work area (e.g., a bed) and/or an amount and/or type of energy provided to the layer of the build material on the work area. In some examples, the agent and/or energy may be differently distributed and/or applied to a layer. For example, one region of a layer may receive a first dosage of agent and/or a first amount of fusing energy and a second region of the layer may receive a second dosage of agent and/or a second amount of fusing energy. While the above example mentions fusing the layer using fusing agent and fusing energy, in other examples, a laser and/or other energy source is used to fuse the layer without the agent being applied, for example. Of course, any current or future additive manufacturing process may employ the teachings of this disclosure.

To enable the objects produced to be recreated in 3D-space, in some examples, a model is generated including metrics, the selected dosing profile and/or any other associated data. The model and/or the associated metrics may include details on the topography of the layers of the objects produced and/or coordinates (X, Y, Z coordinates) representing and/or relating to the layer(s) (e.g., the local details of the layers). Additionally or alternatively, the model and/or the associated metrics (e.g., the coordinates, an array of 3D coordinates) may be used to generate a map of accumulated feature movement in the z-axis, a map of key holes and/or a build-material thickness map within a build plane(s). In some examples, key holes are formed during additive manufacturing processes and have a "keyhole" shape including a wide and elevated head (e.g., at the surface) and a port at the base (e.g., within the part). In some examples, build feature movement in the z-axis may indicate stress accumulation. In some examples, the coordinates representing and/or otherwise describing the different layers can be used to generate a map of key holes after the key holes have been identified in the layer and/or the object by searching characteristics associated with a keyhole.

In some examples, a build-material thickness map can be used to identify a trend(s) in the thickness of build material being formed on a work area. For example, the build-material thickness map can be used to identify a trend (e.g., an unintended trend) of a greater amount of build material being deposited in a first region of the work area and a lesser amount of build material being deposited in a second area of the work area. Additionally or alternatively, the build-material thickness map may be used to identify a trend indicating that a component (e.g., a blade of a build material dispenser) needs to receive maintenance when the trend satisfies and/or otherwise exceeds a threshold. While the build-material thickness map can be generated in different ways, in some examples, the build-material thickness map is generated by obtaining and comparing z-height data for the layers. The comparison may include comparing the z-height data of the upper-most layer and the z-height data of a previous layer(s).

In some examples, the coordinates describing the different layers can be used to represent how the build material is spread and/or distributed for the layers. Using knowledge of the layer of build material including, for example, a thickness of the layer, a topography of the layer, etc., in some examples, a dosing profile and/or map can be selected or otherwise generated that is tailored to the determined metrics of the layer prior to the layer being fused. Additionally or alternatively, using knowledge of the layer or layers of build material and/or characteristics associated with the same, an energy profile and/or map can be selected and/or otherwise generated that is tailored to the determined metrics of the layer prior to the layer being formed. In some examples, a model and/or map of the layer(s) and/or of the object itself can be generated for analysis and/or to otherwise represent the layer(s) and/or the object.

To enable the objects produced using a particular dosing profile to satisfy an expected result and/or to dynamically calibrate and/or otherwise update the dosing profiles before, during and/or after an additive manufacturing process takes place, in some examples, the dosing profiles are updatable. For example, if the object produced in association with a selected dosing profile does not satisfy an expected build characteristic, the dosing profile may be updated by changing the fusing agent and/or the fusing energy applied during a subsequent additive manufacturing process. In some examples, the subsequent additive manufacturing process includes a process(es) performed on the next layer of build material distributed. In some examples, the subsequent additive manufacturing process(es) includes a process(es) performed on the current object being generated. In some examples, the subsequent additive manufacturing process includes a process(es) performed on a subsequent object produced. Thus, based on data and/or knowledge obtained during additive manufacturing processes, the examples disclosed herein update the dosing profiles to enable a desired result to be achieved in subsequent layers and/or objects produced.

FIG. 1 is a block diagram of an example additive manufacturing apparatus and/or a printer 100 that can be used to implement the teachings of this disclosure. In this example, the printer 100 is implemented by a 3D printer that may be used to generate objects, parts, etc. To generate an example object on an example work area (e.g., a bed) 102, in the illustrated example, the printer 100 includes an example image source 104 from which the printer 100 receives an image(s) and/or other data (e.g., a file) describing an object(s) to be produced on the work area 102. In some examples, the work area 102 is removable. In some such examples, the work area 102 is delivered/shipped/sold with the work area 102 detached from the printer 100. In other examples, the work area 102 is coupled to the printer 100.

To produce the object(s) on the work area 102 based on the image(s) and/or other data describing the object, an example build controller 106 causes example first mechanics 108 to move an example build material dispenser 110 relative to the work area 102 to dispense, spread and/or distribute a layer(s) of build material on the work area 102. In some examples, the build material dispenser 110 includes a wiper, a roller, a blade, etc. to distribute and/or dispense a layer of build material on the work area 102. To achieve a selected build material thickness and/or a selected gradient of build material, the build material dispenser 110 is movable via the first mechanics 108 and/or the work area 102 is movable via second mechanics 111.

In the illustrated example, the build material is accessed from an example build material supply 112. To enable unused and/or excess build material to be returned to the build material supply 112, in this example, the work area 102 is coupled to the build material supply 112. While the build material may be directly returned to the build material supply 112 without being processed, in some examples, some processes are performed on the build material prior to returning the build material to the build material supply 112. ass1 illustrates the build material dispenser 110 dispensing the build material directly on the work area 102, in other examples, the build material dispenser 110 may instead be implemented by a build material distributer and a recoater where the build material distributer distributes build material onto a staging area of the printer 100 adjacent the work area 102 and the recoater dispenses, spreads and/or distributes a layer(s) of build material on the work area 102. In such examples, the staging area may be adjacent to and/or part of the work area 102.

To enable characteristics of the layer of deposited build material to be determined, the example printer 100 includes a sensor(s) 113 that generates sensor data. The sensors 113 may be implemented by cameras such as, for example, stereo cameras, infrared (IR) stereo cameras, etc. However, the sensors 113 may be implemented in any other way to enable metrics 114 and/or characteristics of the build material, the layers and/or the objects being formed to be determined.

In examples in which the sensors 113 are implemented by cameras, the sensors 113 obtain image data (e.g., sensor data) that is processed by the example build controller 106 to enable metrics and/or characteristics 114 of the build material and/or the layer to be determined. Some of the metrics 114 may include the topography of the upper-most layer of build material, the thickness of the layer of build material on the work area 102, coordinates describing the layer and/or the object being formed on the work area 102, etc. The coordinates may include, for example, dimensions, pixel-level details and/or voxel-level details of the build material and/or the layer on the work area 102.

In some examples, the processing includes performing an analysis on the sensor data (e.g., the image data) in which z-height data of all layers on the work area 102 is determined and then subtracted from the z-height data of the layers on the work area 102 not including the upper-most layer. Put another way, the thickness of a current layer (e.g., the upper-most layer) 115 on the work area 102 may be determined by subtracting the z-height of the object on the work area 102 (e.g., all layers on the work area 102 except for the current layer 115) prior to the top layer (e.g., the current layer) 115 of build material being deposited from the z-height of the object on the work area 102 after the current layer 115 of build material is deposited on the work area 102 (e.g., all layers on the work area 102 including the current layer 115). In some examples, the build controller 106 generates and/or updates a model 117 that can be used to represent (e.g., visually represent) the object produced and/or being produced. By analyzing the model 117 and/or comparing data of the model 117 to reference data and/or metrics 119, the model 117 may be used to qualify the object being formed by the example printer 100 when the qualifications indicate that the layer and/or the object being formed satisfy a quality threshold. In some examples, the reference data 119 includes data associated with the object being formed, the sensor data includes unprocessed data (e.g., image data) accessed from the sensors 113 and the determined metrics 114 include the results from processing the sensor data including, for example, data describing the topography of the layer 115, dimensions of the layer 115, dimensions and/or characteristics of the object being formed, etc.

To determine if the current layer 115 of the work area 102 is within a threshold of the associated layer described by the image(s) and/or other data, in some examples, the build controller 106 compares the determined metrics 114 from the model 117 to the reference data 119 from a data storage device 120. In this example, the metrics 114, the model 117 and the reference data 119 are stored in the data storage device 120. In examples in which the metrics 114 of the current layer 115 and/or the object being formed on the work area 102 satisfies a threshold of the reference data 119, the build controller 106 associates the layer with satisfying the reference data 119. In examples in which the metrics 114 of the current layer 115 and/or the object being formed on the work area 102 do not satisfy a threshold of the reference data 119, the build controller 106 associates the layer as not satisfying the reference data 119. Additionally and/or alternatively, in examples in which the metrics 114 of the current layer 115 and/or the object being formed on the work area 102 do not satisfy a threshold of the reference data 119, the build controller 106 determines whether to continue the additive manufacturing process.

In examples in which the metrics 114 of the current layer 115 has a characteristic(s) that causes the current layer 115 and/or the object itself not to satisfy a quality threshold and the characteristic(s) is determined not to be rectifiable, the build controller 106 may determine to reject the object being formed and/or to not continue the additive manufacturing process. Alternatively, in examples in which the metrics 114 of the current layer 115 has a characteristic(s) that causes the current layer 115 and/or the object itself not to satisfy the threshold and the characteristic(s) is determined to be rectifiable, the build controller 106 may determine to continue the additive manufacturing process.

In some examples, the build controller 106 rectifies the characteristic(s) by causing the first mechanics 108 to move the example build material dispenser 110 relative to the work area 102 to change characteristics of the upper-most layer of build material on the work area 102. In some examples, the build controller 106 rectifies the characteristic(s) by causing the second mechanics 111 to move the example work area 102 to enable characteristics of the upper-most layer of build material on the work area 102 to change prior to, while and/or after the build material dispenser 110 is moved relative to the work area 102.

To plan how the build material is to be selectively fused and/or to rectify the characteristic(s) of the layer, the build controller 106 selects a dosing profile from a plurality of dosing profiles 123. In this example, the dosing profiles 123 are stored in the data storage device 120. The dosing profile may be associated with the determined metrics 114, the build material and/or the layer 115. In some examples, the dosing profile may cause more or less agent to be deposited on the layer 115 of build material and/or may cause more or less energy to be applied to the layer 115 of build material when causing the build material to be selectively fused together. For example, if a local increase in powder layer thickness near position X, Y within the build layer is detected, the dosing profile (e.g., the selected dosing profile, the generated dosing profile) may cause more fusing agent/energy to be applied adjacent the position X, Y to enable and/or assure complete fusion. In other examples, if a local decrease in powder layer thickness near position X, Y within the build layer is detected, the dosing profile (e.g., the selected dosing profile, the generated dosing profile) may cause the amount of fusing agent/energy to be decreased adjacent the position X, Y (e.g., where measurements indicate thin powder regions) to avoid flooding adjacent the position X, Y with fluid (e.g., adding too much fluid) and/or overheating of the part adjacent the X, Y position. In other words, if a deviation in the physical build process is detected, in some examples, the input parameters are altered to achieve a desired result based on the situation. In some examples, an amount of agent/energy to apply is determined using equations/models that estimate, for example, fluid penetration depth/melting depth as a function of measured build metric deviations and material properties. Some material properties may include a fluid penetration coefficient, a thermal transfer coefficient, a melting point, etc. In some examples, the results are extrapolated from models to determine initial values for these parameters based on assumed and/or estimated build metrics.

To enable the agent to be dispensed on the layer 115 of build material, the build controller 106 causes example third mechanics 122 to move an example agent dispenser 124 including an example printhead 126 and nozzles 128 relative to the work area 102 and overtop of the layer 115 of build material. In some examples, the nozzles 128 deposit agent on the build material in accordance with the selected dosing profile as the nozzles 128 are moved by the third mechanics 122.

In the illustrated example, the agent dispenser 124 and/or the printhead 126 draws and/or accesses the agent from an example agent supply 130. The agent supply 130 may include a chamber(s) (e.g., 1, 2, 3, etc.) that houses an agent(s) (e.g., 1, 2, 3, 4 types of agents) and/or another liquid(s) used during the additive manufacturing process. In some examples, the agent includes a fusing agent, a detailing agent, an agent(s) associated with accuracy and/or detail, an agent(s) associated with opacity and/or translucency and/or an agent(s) associated with surface roughness, texture and/or friction. Additionally or alternatively, in some examples, the agent includes an agent(s) associated with strength, elasticity and/or other material properties, an agent(s) associated with color (e.g., surface and/or embedded) and/or an agent(s) associated with electrical and/or thermal conductivity.

In some examples, during and/or after the nozzles 128 selectively deposit the agent on the build material, the sensors 113 obtain image data and/or the build controller 106 otherwise accesses data associated with the agent dispenser 124 and/or the object being produced, the printhead 126 and/or the nozzles 128. The build controller 106 processes the data to determine an agent dispensing characteristic(s) of the agent deposited, operating characteristics of the agent dispenser 124, the printhead 126 and/or the nozzles 128.

To determine if the agent deposited satisfies a threshold of the corresponding reference dosing profile, in some examples, the build controller 106 compares the agent dispensing characteristics to reference data 119 associated with the selected dosing profile from the data storage device 120. In examples in which the determined agent dispensing characteristics satisfy a threshold of the reference data 119, the build controller 106 associates the agent dispensing characteristics of the current layer 115 of build material with satisfying the reference data 119. In examples in which the determined agent dispensing characteristics do not satisfy a threshold of the reference data 119, the build controller 106 associates the agent dispensing characteristics of the current layer 115 of build material with not satisfying the reference data 119.

In examples in which the build controller 106 associates the agent dispensing characteristics of the current layer 115 of build material as not satisfying the reference data 119, the build controller 106 updates and/or selects an associated dosing profile and/or determines whether to continue the additive manufacturing process. For example, updating (e.g., modifying, changing) the dosing profile may include causing additional agent to be dispensed on the layer 115 of build material and/or causing more or less energy to be applied to the layer 115 of build material. In some examples, updating the dosing profile includes the build controller 106 updating the selected dosing profile to account for a difference and/or deviation from the reference data 119 and/or an expected characteristic and/or metric of the layer and/or object being formed. Thus, using the examples disclosed herein, the build controller 106 is self-learning to enable dosing profiles to be updated so that an expected result is achievable (e.g., objects subsequently produced having certain characteristics, layers substantially produced having certain characteristics, etc.). While the above example mentions determining and comparing agent dispensing characteristics to reference data, in other examples, the build controller 106 additionally or alternatively compares the determined metrics 114 to the reference data 119 to determine if the layer and/or the object being formed satisfies a quality threshold. In some such examples, the dosing profile is updated when the layer and/or the object produced is different than expected.

In the illustrated example, to selectively fuse and/or solidify the build material where the agent has been applied to the layer 115, the build material controller 106 causes the first mechanics 108 to move an example energy source 132 relative to the work area 102 in accordance with the selected dosing profile and to apply energy to the build material on the work area 102 in accordance with the selected dosing profile. The energy source 132 may apply any type of energy to selectively cause the build material to fuse and/or solidify. For example, the energy source 132 may include an infra-red (IR) light source, a near infra-red light source, a laser, etc. While the energy source is illustrated in FIG. 1 as being positioned adjacent the build material dispenser 110 and moved by the first mechanics 108, in other examples, the energy source 132 may be positioned adjacent the agent dispenser 124 and moved by the third mechanics 122. In other examples, the energy source 132 may be moved by dedicated mechanics and stationarily disposed relative to the work area 102.

In some examples, during and/or after the energy source 132 emits energy on the build material, the sensors 113 obtain image data and/or the build controller 106 otherwise accesses data associated with the energy source 132 and/or the object being produced. In this example, the data is processed by the example build controller 106 to determine an energy emission characteristic(s) of the energy applied to the work area 102. To determine if the energy applied to the current layer 115 of build material satisfies a threshold of the corresponding reference dosing profile, in some examples, the build controller 106 compares the energy emission characteristics to reference data 119 associated with the selected dosing profile from the data storage device 120. In examples in which the determined energy emission characteristics satisfy a threshold of the reference data 119, the build controller 106 associates the energy emission characteristics of the current layer 115 of build material with satisfying the reference data 119. In examples in which the energy emission characteristics do not satisfy a threshold of the reference data 119, the build controller 106 associates the energy emission characteristics of the current layer 115 of build material with not satisfying the reference data 119. In examples in which the build controller 106 associates the energy emission characteristics of the current layer 115 of build material with not satisfying the reference data 119, the build controller 106 updates and/or selects an associated dosing profile and/or determines whether to continue the additive manufacturing process. Updating the dosing profile may include causing more energy to be applied to one or multiple portions of the layer of build material. In some examples, updating the dosing profile includes the build controller 106 updating the selected dosing profile to account for the difference and/or deviation from the reference data 119 and/or an expected characteristic and/or metric of the layer and/or object being formed. Thus, using the examples disclosed herein, the build controller 106 is self-learning to enable dosing profiles to be updated so that an expected result is achievable (e.g., objects subsequently produced having certain characteristics, etc.). While the above example mentions determining and comparing energy emission characteristics to the reference data 119, in other examples, the build controller 106 additionally or alternatively compares the determined metrics 114 to the reference data 119 to determine if the layer and/or the object being produced satisfies a quality threshold. In some such examples, the dosing profile is updated when the layer and/or the object produced is different than expected.

In the illustrated example, the example printer 100 of FIG. 1 includes an interface 134 to interface with the image source 104. The interface 134 may be a wired or wireless connection connecting the printer 100 and the image source 104. The image source 104 may be a computing device from which the printer 100 receives data describing a task (e.g., an object to form, a print job, etc.) to be executed by the build controller 106. In some examples, the interface 134 facilitates the printer 100 and/or the build controller 106 to interface with various hardware elements, such as the image source 104 and/or hardware elements that are external and/or internal to the printer 100. In some examples, the interface 134 interfaces with an input or output device, such as, for example, a display device, a mouse, a keyboard, etc. The interface 134 may also provide access to other external devices such as an external storage device, network devices, such as, for example, servers, switches, routers, client devices, other types of computing devices and/or combinations thereof.

In some examples, the example build controller 106 includes hardware architecture, to retrieve and execute executable code from the example data storage device 120. The executable code may, when executed by the build controller 106, cause the build controller 106 to implement at least the functionality of controlling the first mechanics 108 and/or the build material dispenser 110 to dispense build material on the work area 102 based on the image(s) and/or other data describing the object and/or the selected dosing profile. The executable code may, when executed by the build controller 106, cause the build controller 106 to implement at least the functionality of controlling the second mechanics 111 and/or the agent dispenser 124 including the associated printhead 126 and the nozzles 128 to dispense the agent onto the build material based on the image(s) and/or other data describing the object and/or the selected dosing profile. The executable code may, when executed by the build controller 106, cause the build controller 106 to implement at least the functionality of controlling the first mechanics 108 and/or the energy source 132 to apply energy to the build material on the work area 102 to form the object(s) based on the image(s) and/or other data describing the object and/or the selected dosing profile. The executable code may, when executed by the build controller 106, cause the build controller 106 to select and/or update a dosing profile based on metrics 114 of the layer 115 and/or object being formed to enable the objects produced (e.g., current object produced, subsequent objects produced, etc.) using the examples disclosed herein to satisfy a quality threshold. The executable code may, when executed by the build controller 106, cause the build controller 106 to generate an alert and/or to otherwise reject the part being produced if the part does not satisfy the quality threshold. The executable code may, when executed by the example build controller 106, cause the build controller 106 to provide instructions to an example power supply unit 138, to cause the power supply unit 138 to provide power to the example printhead 126 to eject a liquid from the example nozzle(s) 128.

The data storage device 120 of FIG. 1 stores instructions that are executed by the build controller 106 or other processing devices. The example data storage device 120 may store computer code representing a number of applications, firmware, machine readable instructions, etc. that the example build controller 106 executes to implement the examples disclosed herein.

Figure 2:
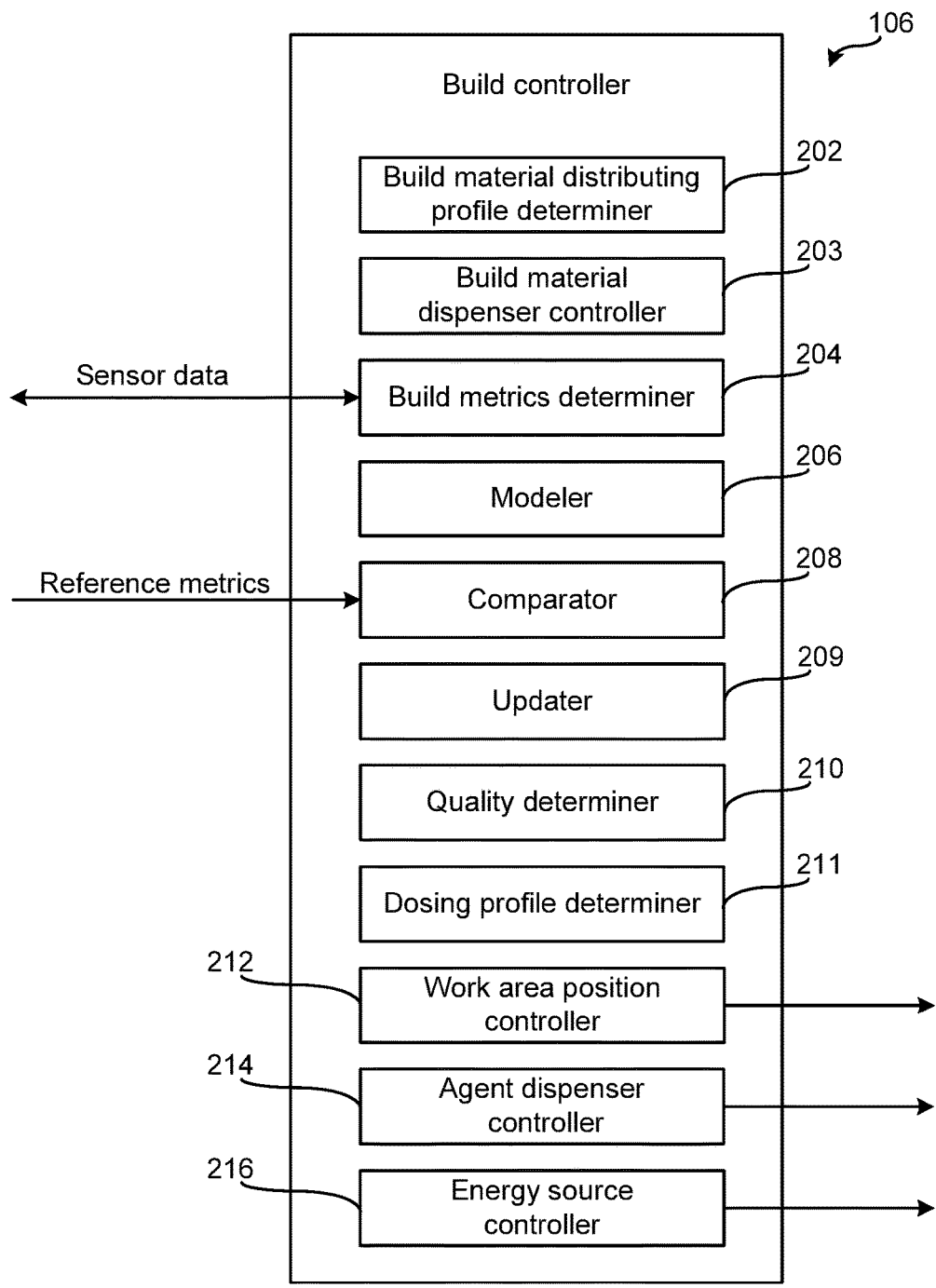
FIG. 2 is a schematic illustration of the example build controller of FIG. 1.

FIG. 2 illustrates an example implementation of the example build controller 106 of FIG. 1. As shown in the example of FIG. 2, the build controller 106 includes an example build material distributing profile determiner 202, an example build material dispenser controller 203, an example build metrics determiner 204, an example modeler 206, an example comparator 208, an example updater 209, an example quality determiner 210, an example dosing profile determiner 211, an example work area position controller 212, an example dispenser controller 214 and an example energy source controller 216.

In the illustrated example, to compensate for build material distributing differences and/or inconsistencies on the work area 102 and/or the top layer of build material on the work area 102, the build material distributing profile determiner 202 identifies the build material to be distributed by the build material dispenser 110 and determines a build material distributing profile that causes the build material dispenser 110 to provide a commanded and/or selected build material gradient and/or layer on the work area 102. If the build material profile determiner 202 determines that a first build material type is to be distributed, the build material dispenser 110 may move at a first rate overtop of the work area 102 when distributing the build material on the work area 102 and, if the build material profile determiner 202 determines that a second build material type is to be distributed, the build material dispenser 110 may move at a second rate overtop of the work area 102 when distributing the build material on the work area 102. Additionally or alternatively, if the build material distributing profile determiner 202 determines that the build material dispenser 110 inadvertently distributes more of the build material on a first side of the work area 102 as compared to a second side of the work area, the build material distributing profile determiner 202 may determine, update and/or otherwise select a build material distributing profile that, when executed by the build material dispenser controller 203, causes the build material dispenser 110 to move at a first rate and/or otherwise distribute a first amount of build material over the first side of the work area 102 and move at a second rate and/or otherwise distribute a second amount of build material over the second side of the work area 102. In other words, the build material distributing profile may cause the build material dispenser 110 to distribute the build material on the work area 102 in a non-uniform manner and/or a uniform manner depending the build material profile selected. While the above example mentions moving the build material distributer 110 at different speeds to achieve a commanded gradient of build material on the work area 102, any other method may be employed to selectively dispense, spread and/or distribute the build material on the work area 102.

The build metrics determiner 204 accesses data from the sensors 113, the first mechanics 108 and/or the build material dispenser 110 and processes the data to determine the metrics 114 of the layer of build material on the work area 102. The metrics 114 may include the topography of the upper-most layer of build material, the thickness of the build material and/or the upper-most layer, dimensions of the upper-most layer including local dimensions, coordinates describing the layer and/or its topography and/or the object being formed on the work area 102, etc. In some examples, the metrics 114 include pixel-level details and/or voxel-level details on the build material and/or the layer on the work area 102. Of course, the metrics 114 may include any additional and/or alternative data relating to the additive manufacturing process taking place.

The modeler 206 generates and/or updates the model 117 which associates and/or maps the determined metrics 114 and the current layer 115 and/or the object being formed. In some examples, the model 117 includes details on the time that the layer was formed, coordinates (X, Y, Z coordinates) representing and/or relating to the layer(s) and/or the topography of the layer(s) and/or the object itself. Additionally or alternatively, the model 117 and/or the associated data (e.g., the coordinates) may be used to generate a map of accumulated feature movement in the z-axis, a map of key holes and/or a build-material thickness map within a build plane(s).

To determine if the metrics 114 of the current layer 115 of build material on the work area 102 are within a threshold of the corresponding reference data 119, the comparator 208 compares the determined metrics 114 and the reference data 119 from the data storage device 120 and the quality determiner 210 determines if the determined metrics 114 are within a threshold of reference data 119. In examples in which the metrics 114 of the current layer 115 and/or the object being formed on the work area 102 satisfy a threshold of the reference data 119, the quality determiner 210 associates the layer with satisfying the reference data 119 and the modeler 206 updates the model 117 accordingly. Additionally or alternatively, in examples in which the metrics 114 of the current layer 115 and/or the object being formed on the work area 102 satisfy a threshold of the reference data 119, the updater 209 associates the selected dispensing profile as achieving and/or satisfying an expected and/or desired result.

Additionally or alternatively, in examples in which the metrics 114 of the current layer 115 and/or the object being formed on the work area 102 do not satisfy a threshold of the reference data 119, the updater 209 associates the selected build material dispensing profile as not achieving and/or satisfying an expected result and/or updates the selected build material dispensing profile accordingly. The selected build material dispensing profile may be updated by incrementally and/or otherwise changing the dispensing characteristics associated with the selected build material dispensing profile to enable a desired and/or expected build material dispensing profile to be achieved during a future/subsequent build. In examples in which the metrics 114 of the current layer 115 and/or the object being formed on the work area 102 do not satisfy a threshold of the reference data 119, the quality determiner 210 associates the layer with not satisfying the reference data 119 and the modeler 206 updates the model 117 accordingly. In examples in which the metrics 114 of the current layer 115 and/or the object being formed on the work area 102 do not satisfy a threshold of the reference data 119, the quality determiner 210 determines whether to continue the additive manufacturing process. When the metrics 114 do not satisfy a threshold of the reference data 119 and the quality determiner 210 determines that the build taking place is not rectifiable, in some examples, the quality determiner 210 may reject the object being formed and/or otherwise not continue the additive manufacturing process.

When the metrics 114 do not satisfy a threshold of the reference data 119 and the quality determiner 210 determines that the build taking place is rectifiable, in some examples, the build material dispenser controller 203 causes the build material dispenser 110 to change the thickness of the current layer 115 and/or change the topography/gradient of the current layer 115. Additionally and/or alternatively, when the quality determiner 210 determines that the build taking place is rectifiable, in some examples, the work area position controller 212 causes the work area 102 to change its position to enable the build material dispenser 110 to change the thickness and/or the topography/gradient of the current layer 115. In some such examples, after the build material dispenser 110 changes a metric(s) of the current layer 115, the sensors 113 obtain updated image data, the build metrics determiner 204 determines updated metrics of the layer and/or the object being built and the modeler 206 updates the model 117 with the updated metrics. Additionally or alternatively, after the build material dispenser 110 changes a metric(s) of the current layer 115, the comparator 208 compares the updated metrics to the reference data 119 and the quality determiner 210 determines if the updated metrics satisfy a threshold of the reference data 119, for example.

When the quality determiner 210 determines that the build taking place is rectifiable and/or when the quality determiner 210 determines that the determined metrics 114 satisfy a threshold of the reference data 119, the dosing profile determiner 211 determines an example dosing profile including an example agent dispensing profile and/or an energy emission profile. In some examples, the agent dispensing profile includes instructions to deposit an amount of agent on a region(s) of the work area 102. In some examples, the energy emission profile includes instructions to emit an amount energy on a region(s) of the work area 102. The amount of agent dispensed and/or the amount of energy emitted may be different from one region of the work area 102 to another.

To enable the build material to be selectively fused and/or coupled to form an object(s), in some examples, the agent dispenser controller 214 causes the agent dispenser 124 including the associated example printhead 126 and the nozzles 128 to move relative to the work area 102 and to dispense agent onto the build material in accordance with the dosing profile. Additionally, in some examples, to enable the build material to be selectively fused and/or coupled to form an object(s), the energy source controller 216 causes the energy source 132 to move relative to the work area 102 and to emit energy onto the build material in accordance with the dosing profile.

To determine if the metrics 114 of the current layer 115 of build material on the work area 102 are within a threshold of corresponding reference data 119 and/or if the object being formed satisfies a threshold of the reference data 119, the build metrics determiner 204 accesses data from the sensors 113, the first mechanics 108, the build material dispenser 110, the energy source 132, the second mechanics 111, the third mechanics 122, the agent dispenser 124, the print head 126 and/or the nozzles 128 and processes the data to determine the metrics 114 of the fused layer of build material and/or of the object being formed on the work area 102 itself.

To determine if the metrics 114 are within a threshold of the reference data 119, the comparator 208 compares the determined metrics 114 and the reference data 119 and the quality determiner 210 determines if the determined metrics 114 are within a threshold of the reference data 119. In examples in which the metrics 114 of the current layer 115 and/or the object being formed on the work area 102 satisfy a threshold of the reference data 119, the quality determiner 210 associates the layer with satisfying the reference data 119 and the modeler 206 updates the model 117 accordingly. Additionally or alternatively, in examples in which the metrics 114 of the current layer 115 and/or the object being formed on the work area 102 satisfy a threshold of the reference data 119, the updater 209 associates the selected dosing profile as achieving and/or satisfying an expected and/or desired result.

In examples in which the metrics 114 of the current layer 115 and/or the object being formed on the work area 102 do not satisfy the threshold of the reference data 119, the quality determiner 210 associates the layer with not satisfying the reference data 119 and the modeler 206 updates the model 117 accordingly. Additionally or alternatively, in examples in which the metrics 114 of the current layer 115 and/or the object being formed on the work area 102 do not satisfy the a threshold of the reference data 119, the updater 209 updates the selected dosing profile to enable a subsequent layer and/or a subsequent build to achieve and/or satisfy an expected and/or desired result. In other words, when the selected dosing profile does not achieve an expected result, in some examples, the dosing profile is updated.

While an example manner of implementing the build controller 106 of FIG. 1 is illustrated in FIG. 2, any one of the elements, processes and/or devices illustrated in FIG. 2 may be combined, divided, re-arranged, omitted, eliminated and/or implemented in any other way. Further, the example build material distributing profile determiner 202, the example build material dispenser controller 203, the example build metrics determiner 204, the example modeler 206, the example comparator 208, the example updater 209, the example quality determiner 210, the example dosing profile determiner 211, the example work area position controller 212, the example agent dispenser controller 214, the example energy source controller 216 and/or, more generally, the example build controller 106 of FIG. 1 may be implemented by hardware, software, firmware and/or any combination of hardware, software and/or firmware. Thus, for example, any of the example build material distributing profile determiner 202, the example build material dispenser controller 203, the example build metrics determiner 204, the example modeler 206, the example comparator 208, the updater 209, the example quality determiner 210, the example dosing profile determiner 211, the example work area position controller 212, the example agent dispenser controller 214, the example energy source controller 216 and/or, more generally, the example build controller 106 of FIG. 1 could be implemented by an analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example build material distributing profile determiner 202, the example build material dispenser controller 203, the example build metrics determiner 204, the example modeler 206, the example comparator 208, the example updater 209, the example quality determiner 210, the example dosing profile determiner 211, the example work area position controller 212, the example agent dispenser controller 214, the example energy source controller 216 and/or, more generally, the example build controller 106 of FIG. 1 is/are hereby expressly defined to include a tangible computer readable storage device or storage disk such as a memory, a digital versatile disk (DVD), a compact disk (CD), a Blu-ray disk, etc. storing the software and/or firmware. Further still, the example build controller 106 of FIG. 1 may include an element(s), process(es) and/or devices in addition to, or instead of, those illustrated in FIG. 2, and/or may include more than one of any or all of the illustrated elements, processes and devices.

Figure 3:
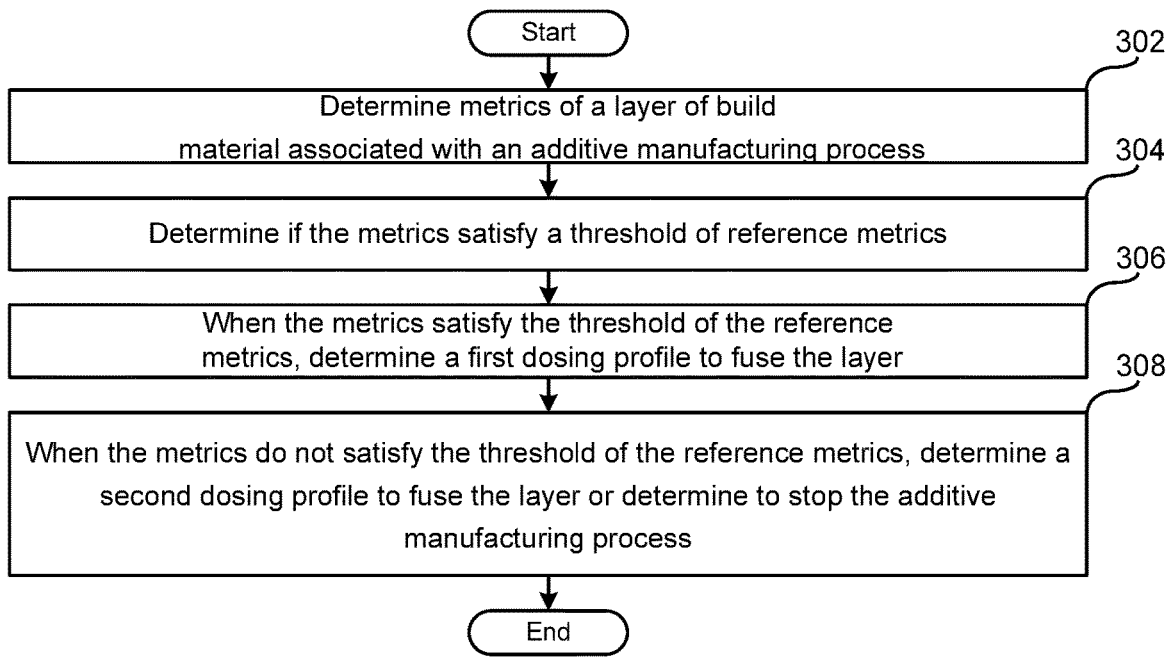
FIG. 3 is a flowchart representative of machine readable instructions that may be executed to implement the example build controller of FIG. 2.
Figure 4:
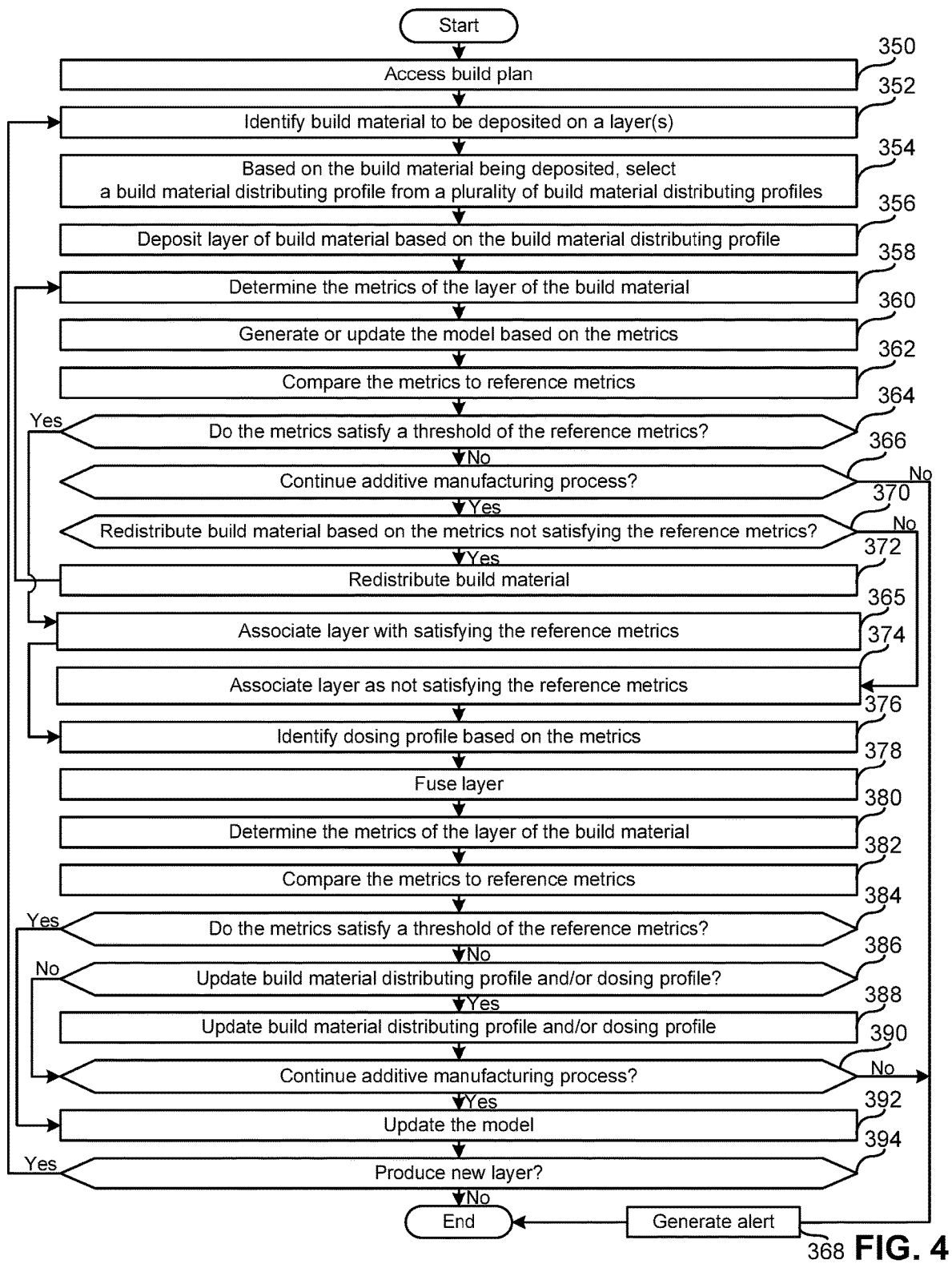
FIG. 4 is a flowchart representative of machine readable instructions that may be executed to implement the example build controller of FIG. 2.

A flowchart representative of example machine readable instructions for implementing the build controller 106 of FIG. 1 is shown in FIGS. 3 and 4. In this example, the machine readable instructions comprise a program for execution by a processor such as the processor 412 shown in the example processor platform 400 discussed below in connection with FIG. 5. The program may be embodied in software stored on a tangible computer readable storage medium such as a CD-ROM, a floppy disk, a hard drive, a digital versatile disk (DVD), a Blu-ray disk, or a memory associated with the processor 412, but the entire program and/or parts thereof could alternatively be executed by a device other than the processor 412 and/or embodied in firmware or dedicated hardware. Further, although the example program is described with reference to the flowchart illustrated in FIGS. 3 and 4, many other methods of implementing the example build controller 106 may alternatively be used. For example, the order of execution of the blocks may be changed, and/or some of the blocks described may be changed, eliminated, or combined.

As mentioned above, the example processes of FIGS. 3 and 4 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 3 and 4 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The program of FIG. 3 begins with the build metrics determiner 204 determining metrics of a layer of build material associated with an additive manufacturing process (block 302). The quality determiner 210 determines if the metrics satisfy a threshold of reference metrics (block 304). When the metrics satisfy the threshold of the reference metrics, the dosing profile determiner 211 determines a first dosing profile to fuse the layer (block 306). When the metrics do not satisfy the threshold of the reference metrics, the dosing profile determiner 211 determines a second dosing profile to fuse the layer or determine to stop the additive manufacturing process. In examples in which the layer is fused based on the second dosing profile and a result of the second dosing profile is different than expected, the updater 209 may update the second dosing profile to a third dosing profile.

The program of FIG. 4 begins with the build controller 106 accessing the build plan(s) from the data storage device 120 (block 350) and the build material distributing profile determiner 202 identifying the build material to be distributed on the work area 102 (block 352). Based on the build material to be distributed/deposited, the build material distributing profile determiner 202 selects a build material distributing profile to distribute the build material in a manner to achieve a desired and/or commanded build material gradient (block 354). At block 356, the build material dispenser controller 203 causes the build material dispenser 110 to distribute the build material on the work area 102 and/or overtop of the previously deposited and/or cured/fused layer of build material in accordance with the selected build material distributing profile (block 356). In some examples, the build material dispenser controller 203 causes the work area 102 to move, via the second mechanics 111, to enable a desired build material thickness, topography and/or gradient to be achieved.

The build metrics determiner 204 determines metrics of the layer of build material (block 358). In some examples, the build metrics determiner 204 determines the metrics 114 of the upper-most layer of build material and/or any one of the layers of the build material by processing data accessed from the sensors 113, etc. In some examples, the sensors 113 monitor the build and/or parameters of any one of the components 110, 111, 112, 122, 124, 126, 132, etc. while any of the processes disclosed herein are taking place. In some examples, the sensors 113 monitor the build and/or parameters of any one of the components 110, 111, 112, 122, 124, 126, 132, etc. after any one of the additive manufacturing processes disclosed herein have taken place. Based on the determined metrics 114, the modeler 206 generates and/or updates the model 117 (block 360). In some examples, the model 117 maps and/or otherwise associates characteristics, parameters, etc. of the object being formed using the printer 100. Additionally or alternatively, in some examples, the model 117 maps and/or otherwise associates one of the layers of an object being produced with an associated build material, a thickness of the layer, a topography including an upper-surface topography of the layer, a lower-surface topography of the layer, etc.

The comparator 208 compares the metrics 114 of a layer(s) of the object being formed on the work area 102 with corresponding reference data 119 (block 362) and the quality determiner 210 determines if the measured/determined metrics 114 are within a threshold of the reference data 119 (block 364). In examples in which the metrics 114 of the layer(s) of the object being formed satisfies the threshold, the modeler 206 associates the layer with satisfying the reference data 119 (block 365). In examples in which the metrics 114 of layers of the object being formed do not satisfy the threshold, the quality determiner 210 determines whether to continue the additive manufacturing process (block 366). If the quality determiner 210 determines not to continue the additive manufacturing process, the quality determiner 210 generates an alert (block 368) and the program of FIG. 4 ends. In some examples, the alert includes details on a component of the printer 100 to receive maintenance and/or that the object being produced does not satisfy a quality threshold. For example, in examples in which the gradient of the build material being deposited on the work area 102 does not satisfy a threshold, the alert may include an indication to replace a component of the build material dispenser 110 such as a blade, roller, wiper, etc.

If the determined metrics 114 do not satisfy the reference data 119 and the quality determiner 210 determines to continue the additive manufacturing process, the quality determiner 210 determines whether the build material should be redistributed (block 370). In examples in which the quality determiner 210 determines that the build material should be redistributed and/or that the layer should otherwise be reformed, the build material dispenser controller 203 causes the build material dispenser 110 to redistribute the build material, change the thickness of the build material and/or change the topography of the upper-most layer of build material on the work area 102 (block 372). The program then returns to block 308 where the build metrics determiner 204 determines the metrics 114 of the layer of the build material (block 358). In examples in which the quality determiner 210 determines that the build material should not be redistributed and/or that the layer should not otherwise be reformed, the modeler 206 associates the layer with not satisfying the reference data 119 (block 374).

The dosing profile determiner 211 determines a dosing profile to fuse the build material on the work area 102 based on the determined metrics 114 (block 376) and the layer is fused (block 378). In some examples, to fuse and/or otherwise couple the layers of the object being produced, the agent dispenser controller 214 causes the agent dispenser 124 to dispense agent on the layer in accordance with the determined dosing profile and the energy source controller 216 causes the energy source 132 to emit energy on the layer in accordance with the determined dosing profile.

The build metrics determiner 204 determines metrics 114 of the layer of build material (block 380). In some examples, the metrics 114 of the layer after being fused are different from the metrics 114 before the layer is fused. In some examples, the metrics 114 of the layer after agent has been deposited thereon are different from the metrics 114 before the agent is deposited thereon. The comparator 208 compares the metrics 114 of a layer(s) of the object being formed on the work area 102 with corresponding reference data 119 (block 382) and the quality determiner 210 determines if the measured/determined metrics 114 are within a threshold of the reference data 119 (block 384).

In examples in which the metrics 114 do not satisfy the threshold of the reference data 119, the updater 240 determines whether to update the build material distributing profile and/or the dosing profile (block 386). The build material distributing profile may be updated when a thickness and/or characteristic of the build material distributed on the work area 102 is different than an expected thickness and/or characteristic of the build material on the work area 102 for a number of times (e.g., three times in a row) and/or for any other reason. The dosing profile may be updated when a metric and/or characteristic of the layer and/or object being formed on the work area 102 is different than an expected metric and/or characteristic of the layer and/or object and/or for any other reason. If the updater 240 determines to update the build material distributing profile and/or the dosing profile, the updater 240 updates the build material distributing profile and/or the dosing profile (block 388). When the metrics 114 do not satisfy the threshold, the quality determiner 210 determines whether to continue the additive manufacturing process (block 390). If the quality determiner 210 determines not to continue the additive manufacturing process, the quality determiner 210 generates the alert (block 368) and the program of FIG. 4 ends.

If the quality determiner 210 determines to continue the manufacturing process and/or if the metrics 114 satisfy the threshold of the reference metrics, the modeler 206 updates the model 117 by associating and/or otherwise mapping the build metrics 114 and the dosing profile with the associated layers formed (block 392). At block 394, the build controller 106 determines whether or not to produce a new layer (block 394).

Figure 5:
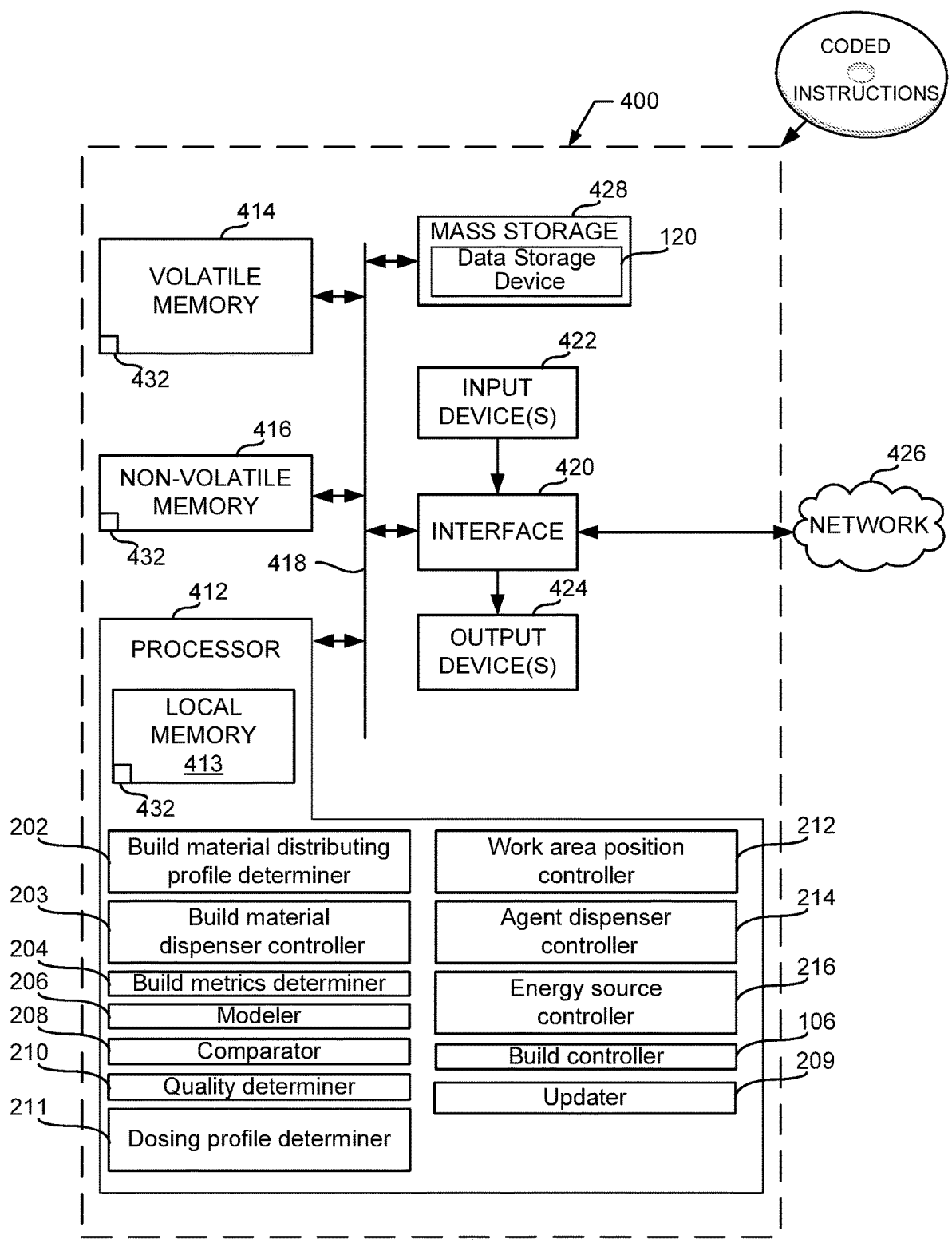
FIG. 5 is a processor platform to execute the instructions of FIGS. 3 and 4 to implement the example build controller of FIG. 2.

FIG. 5 is a block diagram of an example processor platform 400 capable of executing the instructions of FIGS. 3 and 4 to implement the build controller 106 of FIG. 1. The processor platform 400 can be, for example, a server, a personal computer, a mobile device (e.g., a cell phone, a smart phone, a tablet such as an iPad™), a personal digital assistant (PDA), an Internet appliance or any other type of computing device.

The processor platform 400 of the illustrated example includes a processor 412. The processor 412 of the illustrated example is hardware. For example, the processor 412 can be implemented by integrated circuits, logic circuits, microprocessors and/or controllers from any desired family or manufacturer. In the illustrated example, the processor 412 implements the example build material distributing profile determiner 202, the example build material dispenser controller 203, the example build metrics determiner 204, the example modeler 206 the example comparator 208, the updater 209, the example quality determiner 210, the example dosing profile determiner 211, the example work area position controller 212, the example dispenser controller 214, the example energy source controller 216 and the example build controller 106.

The processor 412 of the illustrated example includes a local memory 413 (e.g., a cache). The processor 412 of the illustrated example is in communication with a main memory including a volatile memory 414 and a non-volatile memory 416 via a bus 418. The volatile memory 414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 416 may be implemented by flash memory and/or any other desired type of memory device. Access to the main memory 414, 416 is controlled by a memory controller.

The processor platform 400 of the illustrated example also includes an interface circuit 420. The interface circuit 420 may be implemented by any type of interface standard, such as an Ethernet interface, a universal serial bus (USB), and/or a PCI express interface.

In the illustrated example, an input device(s) 422 is connected to the interface circuit 420. The input device(s) 422 permit(s) a user to enter data and commands into the processor 412. The input device(s) can be implemented by, for example, an audio sensor, a microphone, a camera (still or video), a keyboard, a button, a mouse, a touchscreen, a track-pad, a trackball, isopoint and/or a voice recognition system An output device(s) 424 is also connected to the interface circuit 420 of the illustrated example. The output devices 424 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 420 of the illustrated example, thus, typically includes a graphics driver card, a graphics driver chip or a graphics driver processor.

The interface circuit 420 of the illustrated example also includes a communication device such as a transmitter, a receiver, a transceiver, a modem and/or network interface card to facilitate exchange of data with external machines (e.g., computing devices of any kind) via a network 426 (e.g., an Ethernet connection, a digital subscriber line (DSL), a telephone line, coaxial cable, a cellular telephone system, etc.).

The processor platform 400 of the illustrated example also includes a mass storage device(s) 428 for storing software and/or data. Examples of such mass storage devices 428 include floppy disk drives, hard drive disks, compact disk drives, Blu-ray disk drives, RAID systems, and digital versatile disk (DVD) drives. In the illustrated example, the mass storage device(s) 428 implements the data storage device 120.

The coded instructions 432 of FIGS. 3 and 4 may be stored in the mass storage device 428, in the volatile memory 414, in the non-volatile memory 416, and/or on a removable tangible computer readable storage medium such as a CD or DVD.

From the foregoing, it will be appreciated that the above disclosed methods, apparatus and articles of manufacture relate to three-dimensional (3D) printers that generate models based on metrics of objects being formed and/or layers that make up those objects. Using the models generated in associated with the teachings of this disclosure, objects and/or parts produced can be determined to meet a quality threshold without additional quality procedures taking place (e.g., off-line quality procedures, etc.).

In some examples, when producing an object(s) using the example printers disclosed herein, inconsistencies in the layers being deposited may change the quality of the object(s) being produced. To deter objects from being produced having a quality level that does not satisfy a threshold and/or to otherwise minimize scrap parts produced in a manufacturing environment (e.g., parts that do not satisfy the quality threshold), the examples disclosed herein monitor the work area and/or the build material deposited thereon and dynamically adjust the thickness and/or the topography of the build material to enable the layers of the objects produced to satisfy a threshold of reference data 119.

Additionally or alternatively, to deter objects from being produced having a quality level that does not satisfy a threshold and/or to otherwise minimize scrap parts produced in a manufacturing environment (e.g., parts that do not satisfy the quality threshold), the examples disclosed herein monitor the work area and/or the build material deposited thereon and select a dosing profile that is associated with the determined metrics. For example, a first dosing profile may be selected for a first layer of build material having a first thickness and/or other characteristics and a second dosing profile may be selected for a second layer of build material having a second thickness and/or other characteristics. In examples in which the first thickness is greater than the second thickness, the first dosing profile may cause more agent and/or more energy to be applied to fuse the first layer and the second dosing profile may cause less agent and/or less energy to be applied to fuse the second layer. Of course, any amount of agent and/or any amount of energy may be used to enable the objects produced according to the teachings of this disclosure to satisfy a quality threshold.

Example 1

An example printer includes a work area on which a layer of build material is to be deposited; a build controller to access metrics of the layer and to select a dosing profile from a plurality of dosing profiles to fuse the layer based on the metrics; and an agent distributer including a nozzle, the agent distributer to cause the nozzle to distribute an agent onto the layer based on the dosing profile.

Example 2

In Example 1 or other examples, the printer includes an energy source, the energy source to emit energy onto the layer based on the dosing profile.

Example 3

In Examples 1, 2 or other examples, the metrics are first metrics and the layer is a first layer, further including a build material dispenser, in response to the first metrics not satisfying a threshold, the build controller to cause the build material dispenser to change the first layer.

Example 4

In Example 3 or other examples, the build controller is to access second metrics of a second layer and to process the second metrics to determine if the second metrics satisfy reference metrics.

Example 5

In Example 4 or other examples, the dosing profile is a first dosing profile, in response to the second metrics not satisfying the reference metrics, the build controller to select a second dosing profile from the plurality of dosing profiles to fuse the second layer based on the second metrics, in response to the second metrics satisfying the reference metrics, the build controller to select a third dosing profile from the plurality of dosing profiles to fuse the second layer based on the second metrics.

Example 6

In Examples 3, 4 or other examples, the build controller is to select a second dosing profile from the plurality of dosing profiles to fuse the second layer based on the second metrics.

Example 7

In Example 6 or other examples, the build controller includes a modeler to generate a model to represent the first layer and the second layer, the model including the first metrics and the second metrics.

Example 8

In Example 1, 2, 3, 4, 5, 6, 7 or other examples, the build controller includes an updater to update the dosing profile when a result of the dosing profile is different than expected.

Example 9

An example apparatus includes a build metrics determiner to determine metrics of a layer of build material associated with an additive manufacturing process; a quality determiner to determine if the metrics satisfy a threshold of reference metrics; and a dosing profile determiner, when the metrics satisfy the threshold of the reference metrics, the dosing profile determiner to determine a first dosing profile to fuse the layer, when the metrics do not satisfy the threshold of the reference metrics, the dosing profile determiner to determine a second dosing profile to fuse the layer or to determine to stop the additive manufacturing process.

Example 10

In Example 9 or other examples, the first dosing profile is different from the second dosing profile.

Example 11

In Examples 9, 10 or other examples, further including an agent dispenser controller to cause agent to be dispensed on the layer based on the first dosing profile or the second dosing profile.

Example 12

In Examples 9, 10, 11 or other examples, further including an energy source controller to cause energy to be emitted onto the layer based on the first dosing profile or the second dosing profile.

Example 13

An example method includes determining, by executing an instruction with at least one processor, metrics of a layer of build material associated with an additive manufacturing process; determining, by executing an instruction with the at least one processor, if the metrics satisfy a threshold of reference metrics; when the metrics satisfy the threshold of the reference metrics, determining, by executing an instruction with the at least one processor, a first dosing profile to fuse the layer; and when the metrics do not satisfy the threshold of the reference metrics, determining, by executing an instruction with the at least one processor, a second dosing profile to fuse the layer or determine to stop the additive manufacturing process.

Example 14

In Example 13 or other examples, further including fusing the layer based on the second dosing profile and updating the second dosing profile to a third dosing profile when a result of the second dosing profile is different than expected.

Example 15

In Examples 13, 14 or other examples, further including causing agent to be dispensed on the layer based on the first dosing profile or the second dosing profile and causing energy to be emitted onto the layer based on the first dosing profile or the second dosing profile.

Example 16

An example printer includes a build controller to access metrics of a layer on a work area and to select a dosing profile from a plurality of dosing profiles to fuse the layer based on the metrics.

Example 17

In Example 16 or other examples, further including an agent distributer including a nozzle, the agent distributer to cause the nozzle to distribute an agent onto the layer based on the dosing profile.

Example 18

In Examples 16, 17 or other examples, further including an energy source, the energy source to emit energy onto the layer based on the dosing profile.

Example 19

In Examples 16, 17, 18 or other examples, the metrics are first metrics and the layer is a first layer, further including a build material dispenser, in response to the first metrics not satisfying a threshold, the build controller to cause the build material dispenser to change characteristics of the first layer.

Example 20

In Example 19 or other examples, the build controller is to access second metrics of a second layer and to process the second metrics to determine if the second metrics satisfy reference metrics.

Example 21

In Example 20 or other examples, the dosing profile is a first dosing profile, in response to the second metrics not satisfying the reference metrics, the build controller to select a second dosing profile from the plurality of dosing profiles to fuse the second layer based on the second metrics, in response to the second metrics satisfying the reference metrics, the build controller to select a third dosing profile from the plurality of dosing profiles to fuse the second layer based on the second metrics.

Example 22

In Example 21 or other examples, the build controller is to select a second dosing profile from the plurality of dosing profiles to fuse the second layer based on the second metrics.

Example 23

In Example 22 or other examples, the build controller includes a modeler to generate a model to represent the first layer and the second layer, the model including the first metrics and the second metrics.

Example 24

In Example 16, 17, 18, 19, 20, 21, 22, 23 or other examples, the build controller includes an updater to update the dosing profile when a result of the dosing profile is different than expected.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A printer, comprising:
instructions stored in a memory; and
a build controller to execute the instructions to:
determine a thickness of a first layer of a build material based on a difference between (a) first height data of the build material including the first layer and one or more other layers and (b) second height data of the build material including the one or more other layers and not including the first layer;
select a first dosing profile from a plurality of dosing profiles to fuse a first layer based on the thickness determined and a fluid penetration depth of the first layer defined by metrics associated with the first layer;
cause the first dosing profile to be used to fuse the first layer to generate a first fused layer;
perform a comparison of metrics associated with the first fused layer to a reference threshold;
in response to the comparison, update the first dosing profile to generate a second dosing profile; and
cause the second dosing profile to be used to fuse a second layer to generate a second fused layer.

2. The printer of claim 1, further including an agent distributer including a nozzle, the agent distributer to cause the nozzle to distribute an agent onto the first layer based on the first dosing profile.

3. The printer of claim 1, further including an energy source, the energy source to emit energy onto the first layer based on the first dosing profile to fuse the first layer.

4. The printer of claim 1, further including a build material dispenser, the build controller to cause the build material dispenser to change characteristics of the second layer based on the second dosing profile.

5. The printer of claim 4, wherein the metrics associated with the first fused layer are first metrics and the build controller is to determine if second metrics associated with the second fused layer satisfy reference metrics.

6. The printer of claim 5, wherein the build controller is to select a third dosing profile from the plurality of dosing profiles based on the second metrics.

7. The printer of claim 5, wherein the build controller is to generate a model to represent the first fused layer and the second fused layer, the model including the first metrics and the second metrics.

8. The printer of claim 1, wherein the build controller is to update the second dosing profile when a result of the second dosing profile is different than expected.

9. The printer of claim 1, wherein the build controller includes a processor.

10. The printer of claim 1, wherein the build controller is to determine one or more other metrics of the first layer, the one or more other metrics including a gradient of a material of the first layer or a topography of the first layer.

11. The printer of claim 1, wherein the build controller is to determine the first height data based on image data output by a visible light stereographic camera.

12. An apparatus, comprising:
a build metrics determiner to determine a thickness of a first layer of build material associated with an additive manufacturing process based on a difference between (a) first height data of a build material including a plurality of layers including the first layer and (b) second height data of the build material including a subset of the plurality of layers;
a quality determiner to determine if the thickness satisfies a threshold;
a dosing profile determiner to:
when the thickness satisfies the threshold, determine a first dosing profile to fuse the first layer to generate a first fused layer; and
when the thickness does not satisfy the threshold, determine a second dosing profile to fuse the first layer to generate the first fused layer;
an updater to update one of the first dosing profile or the second dosing profile based on metrics associated with the first fused layer to generate one of an updated first dosing profile or an updated second dosing profile based on a thickness and a fluid penetration depth of the first fused layer defined by metrics associated with the first fused layer;
the dosing profile determiner to select the one of the updated first dosing profile or the updated second dosing profile to fuse a second layer of the build material.

13. The apparatus of claim 12, further including an agent dispenser controller to cause agent to be dispensed on the first layer based on the first dosing profile.

14. The apparatus of claim 12, further including an energy source controller to cause energy to be emitted onto the first layer based on the first dosing profile.

15. The apparatus of claim 12, wherein the thickness is a first metric of the first layer and the build metrics determiner to determine a second metric of the first layer, the second metric including one or more of a gradient of the build material of the first layer or a topography of the first layer.

16. A method, comprising:
determining, by executing an instruction with at least one processor, a thickness of a first layer of build material associated with an additive manufacturing process based on a difference between (a) first height data of a build material including the first layer and one or more other layers and (b) second height data of the build material including the one or more other layers and not including the first layer;
determining, by executing an instruction with the at least one processor whether the thickness of the first layer satisfies a threshold;
when the thickness satisfies the threshold;
determining, by executing an instruction with the at least one processor, a first dosing profile to fuse the first layer to generate a first fused layer; and
causing, by executing an instruction with the at least one processor, the first layer to be fused based on the first dosing profile;
when the thickness does not satisfy the threshold,
determining, by executing an instruction with the at least one processor, a second dosing profile to fuse the first layer to generate the first fused layer; and
causing, by executing an instruction with the at least one processor, the first layer to be fused based on the second dosing profile;
updating, by executing an instruction with the at least one processor, one of the first dosing profile or the second dosing profile based on metrics associated with the first fused layer to generate one of an updated first dosing profile or an updated second dosing profile based on a thickness and a fluid penetration depth of the first fused layer defined by metrics associated with the first fused layer; and selecting the one of the updated first dosing profile or the updated second dosing profile to fuse a second layer of the build material.

17. The method of claim 16, further including causing an agent to be dispensed on the first layer based on the first dosing profile or the second dosing profile.

18. The method of claim 16, further including causing a first amount of energy to be emitted onto the first layer based on the first dosing profile or causing a second amount of energy to emitted onto the first layer based on the second dosing profile, the second amount of energy different than the first amount of energy.

19. The method of claim 16, wherein the thickness is a first metric of the first layer and further including determining a second metric of the first layer, the second metric including one or more of a gradient of the build material of the first layer or a topography of the first layer.

\* \* \* \* \*